Oct. 7, 1969  W. A. HOSBACH  3,470,600
TOOL FOR LOCK RINGS
Filed Sept. 26, 1967
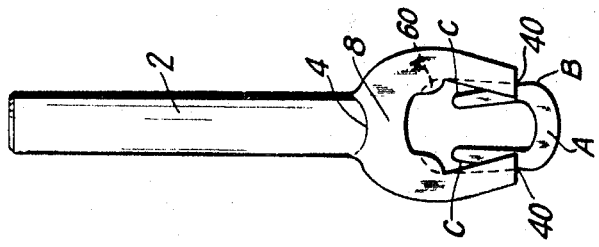
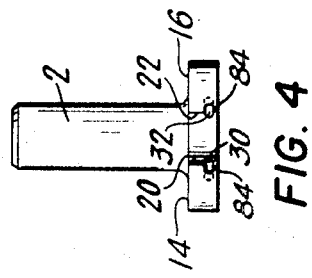
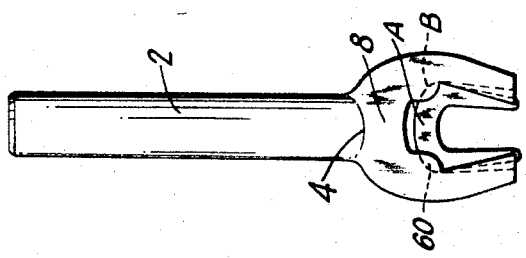
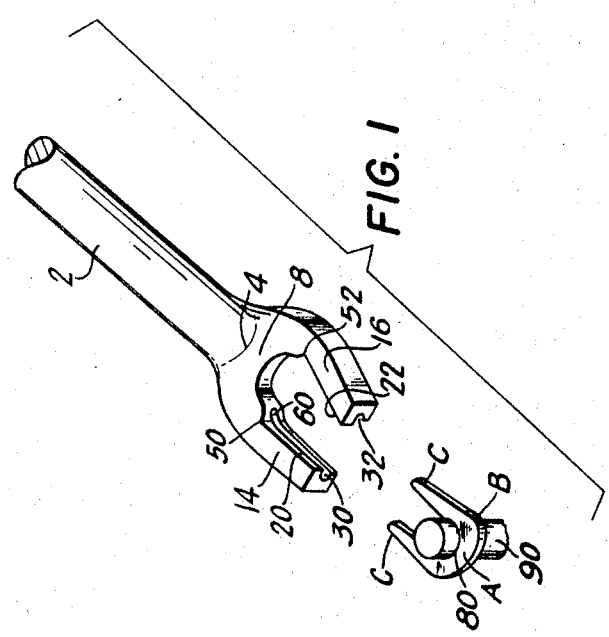
INVENTOR.
WILLIAM A. HOSBACH
BY Eugene P. Girman
his Attorney

United States Patent Office 3,470,600
Patented Oct. 7, 1969

3,470,600
TOOL FOR LOCK RINGS
William A. Hosbach, Baldwin Township, Allegheny County, Pa. (715 Newport Drive, Pittsburgh, Pa. 15234)
Filed Sept. 26, 1967, Ser. No. 675,006
Int. Cl. B23p *19/60;* B25b *27/14*
U.S. Cl. 29—243.57                4 Claims

ABSTRACT OF THE DISCLOSURE

A tool for applying and removing lock rings. The tool has an elongated handle and two legs with facing grooves which taper toward the ends of the legs to define a narrowing gap. Forcing the tool over the closed end of the lock ring will bend the ring around an object. Forcing the tool along the open end of the lock ring will remove the ring.

BACKGROUND OF INVENTION

Field of invention

Horseshoe-shaped lock rings used for retaining a shaft within a bore, such as, for example, the shaft in lock ring used to mount the parking brake actuating lever to the brake shoe on automobiles.

Description of prior art

Horeshoe-shaped lock rings are usually fitted into a circumferential groove or slot on a shaft. The shaft is formed with a groove. Accordingly, the lock ring (when installed on the shaft) serves to retain the shaft within a bore. A common example of the use of such a shaft and lock ring is found on automobiles where the aforementioned shaft is used to mount the parking brake actuating lever to the brake shoe.

When the brake shoe is removed for renewal of the brake lining thereon, it is often necessary to disengage the parking brake actuating lever from the shoe. To disengage the lever, it is first necessary to drive the lock ring out of the groove in the shaft, and then to remove the shaft from the holes or bores in the lever and shoe.

Removal of this lock ring has always presented a difficult problem. To be effective as a locking device the ring must fit tightly in the groove. This snugness, however, necessitates the use of force to remove the lock ring. It is, therefore, common to use a screwdriver or pliers to assist in such removal. However, such tools are unsatisfactory. A screwdriver, when used, must have a blade wide enough to engage both arms of the lock ring, else the ring will merely pivot about the shaft. Furthermore, the blade often slips out of engagement with the edges of the arms of the relatively thin ring. Pliers, when used, will bend or distort the ring, rendering it useless.

SUMMARY OF INVENTION

It is, therefore, the object of this invention to provide a tool to remove such lock rings or keepers.

It is another object to provide a tool which may be used to install or seat such lock rings.

It is a further object to provide a tool having no moving parts, which positively grasps the lock ring without slipping or damage to the lock ring, to effect removal of the lock ring.

Other objects of the invention will become apparent from the accompanying drawing and description.

In accordance with the invention, a tool is provided for the removal and installation of horseshoe-shaped lock rings having a main portion and a handle portion centrally attached to the main portion, a pair of leg members depending from the main portion being attached thereto adjacent the handle portion, the leg members each having an end portion, spaced apart from the main portion. The leg members are tapered slightly toward each other adjacent the end portions to define a gap between the leg members which is slightly smaller at the end of the leg members. The leg members each have a groove cut therein facing one another. The grooves extend from the ends of the legs, toward the main portion to receive the horseshoe-shaped lock rings. The distance between the grooves at the ends of the legs is greater than the distance between the outer edges of the arms of the lock ring but less than the distance between the shoulder portions of the lock ring to enable the tool to grasp the lock ring adjacent the shoulders to disengage the lock ring. The legs on the tool each have an enlarged cutaway portion facing one another at a point between the end and main portion respectively. The cutaway portion is enlarged sufficiently to allow passage of the lock ring there between at the wide shoulder sections of the lock ring. The enlarged cutaway portions cooperate with the grooves on the tapered leg members to enable the lock ring to be inserted and retained in the grooves for installation of the lock ring.

BRIEF DESCRIPTION OF DRAWINGS

The invention may be better understood by referring to the drawing in which:

FIGURE 1 is an isometric view of the tool and a lock ring installed on a shaft.

FIGURE 2 is a top view of the tool showing the lock ring retained therein in position for installation.

FIGURE 3 is a top view of the tool showing the lock ring being grasped in a removal position.

FIGURE 4 is an end view illustrating the position and shape of the grooves in the legs of the tool.

DESCRIPTION OF PREFERRED EMBODIMENT

Referring now to the drawings, the novel tool as shown in FIGURE 1 may be grasped by handle 2 which is attached at 4 to the main portion of the tool 8. The tool has leg members 14 and 16 which have inner edges 20 and 22 respectively which taper toward one another at the ends of the leg member to define a narrowing gap. The inner edges 20 and 22 have have grooves 30 and 32 cut therein as may be best viewed in FIGURE 4. The grooves are cut to a depth sufficient to allow passage therein of the outer edges of the arms of a lock ring or horseshoe keeper such as indicated at A in FIGURES 2 and 3. The grooves, at the outer ends of the legs of the tool define a width narrower, however, than the width of the shoulder portion of the lock ring indicated as B.

The lock ring is removed (as seen in FIGURE 3) by engaging the outer edges of the arms of the lock ring— indicated as C in grooves 30 and 32 and sliding the arms in the grooves until the shoulder B are engaged by the ends of legs 14 and 16 of the tool as shown as 40 in FIGURE 3. The tool is then gently but firmly moved forward forcing the lock ring from its retaining position on a shaft.

The tool is also useful for installing the lock rings in their retaining position. FIGURE 2 illustrates the tool holding the lock ring in a position for installation. The tool is formed with cutaway sections 50 and 52 in inner edges 20 and 22 respectively at an intermediate point from the end of the edge. The cutaway sections define an opening between the legs of the tool greater than the width of the shoulders of the lock ring A. Directly back of the cutaway portion, adjacent the main body 8 a second groove is cut into each leg on the inner edge thereof. Grooves 60 may actually be an extension of the grooves 30 and 32 found at the outer ends of the legs. The function of the grooves 60 is to retain the shoulders of lock ring A while the lock ring is installed into its retaining position on a shaft or the like. The lock ring is placed in the tool by bringing the ring, at a right angle to the planes of the top and inner edges of the legs, through the enlarged cutaway sections and then rotating the ring while sliding the shoulder portions B of the lock ring into grooves 60 as shown in FIGURE 2.

In this connection it should be noted, as best seen in FIGURE 4, that the lower wall of grooves 30 and 32 respectively is cut large enough to allow the outer edges C of the lock ring keeper to pass there between, as indicated at 84. This allows the lock ring to assume the position seen in FIGURE 2. This enlargement does not interfere with the removal function of grooves 30 and 32 since the grooves merely act as a guide when the tool is first slid onto the ring and the grooves do not react functionally in the removal until contact is made with the shoulders B.

The lock ring is installed on a shaft by engaging the arms of the lock ring in the slot or groove 80 of the shaft 90 while grasping the tool by the handle portion 2. The tool and ring are thrust forward toward shaft 90 to fully seat the lock ring in groove 80. Pressure, by means of a hammer or the like, can then be applied to the handle of the tool to cause the legs of the keeper to bend around the shaft.

The tool is then disengaged from the lock ring after installation by sliding the tool away from the lock ring and shaft 90 until shoulder portions B on the lock ring are positioned adjacent enlarged cutaway portions 50 and 52, the tool is then raised to enable shoulders B of the lock ring to leave grooves 30 and 32. The tool is then pulled away from the shaft.

The invention thus provides a ready means for both removal and installation of lock rings and thus enables the skilled or unskilled mechanic to readily remove and install such lock rings without the problems and deficiencies previously encountered.

I claim:

1. A tool for the removal and installation of horseshoe-shaped lock rings, said lock ring having an arched central portion with two parallel arms extending from said arched central portion, said arms having facing inner edges spaced apart from one another, said arms having enlarged shoulder portions on their outer edges at the jointure points of said arms with said arched central portion, said tool having a main portion and a handle portion centrally attached to said main portion, said main portion having a pair of leg members depending therefrom, said leg members being joined to said main portion adjacent said handle portion, said leg members each having an end portion spaced apart from said main portion, said leg members being tapered slightly toward each other adjacent said end portions to define a gap between said members slightly smaller at said ends, said leg members each having a groove cut therein and facing one another, said grooves extending from said ends toward said main portion to receive said horseshoe-shaped lock ring therein, the distance between said grooves at the ends of said legs being greater than the distance between the outer edges of the arms of said lock ring at the end of said arms but less than the distance between the shoulder portions of said lock ring to enable the tool to grasp the lock ring adjacent the shoulders to disengage the lock ring, said legs on said tool each having an enlarged cutaway portion facing one another at a point between said end and said main portion respectively, said cutaway portions being enlarged sufficiently to allow passage of said lock ring there between at the wide shoulder sections of the lock ring, said enlarged cutaway portions cooperating with said grooves on said tapered leg members to enable the lock ring to be inserted in the grooves for installation of the lock ring, said tool being disengaged from the lock ring after installation of the lock ring by sliding the tool away from the lock ring until the shoulder portions of the ring are positioned adjacent the enlarged cutaway portions and then raising the tool to enable the shoulders of the lock ring to leave the grooves, at the cutaway portions.

2. The tool of claim 1 wherein the facing edges of said arms on one side of the grooves are spaced apart a distance greater than the distance between the ends of the legs of the lock ring keeper to facilitate guiding the lock ring legs into said groove.

3. A tool for the removal and installation of horseshoe-shaped lock rings of the class described, said tool having a bifurcated portion comprising a pair of arms having facing edges tapering inwardly adjacent the ends of the arms and having grooves in said edges to engage the outer edges of said lock ring, said grooves defining, at the ends of the arms, a distance greater than the width of end portions of said lock rings but less than the enlarged shoulder portions, said arms having enlarged cutaway portions spaced from said ends defining a gap there between large enough to pass the shoulder portions of said lock ring there through for insertion in said grooves, in an installation position.

4. The tool of claim 3 wherein said grooves extend along the facing edges of the arms from the ends of said arms to a point beyond said enlarged cutaway portions to define a retaining portion on each arm adjacent the central portion of the tool which retaining portion engages the shoulders of said lock ring when the tool is in an installation relationship with said lock ring.

References Cited

UNITED STATES PATENTS

| 2,272,355 | 2/1942 | Schnell | 29—229 X |
| 2,483,379 | 9/1949 | Brell | 29—229 |
| 2,650,722 | 9/1953 | Stabile | 29—229 X |
| 3,173,197 | 3/1965 | Tuller | 29—229 |

ROBERT C. RIORDON, Primary Examiner

J. C. PETERS, Assistant Examiner

U.S. Cl. X.R.

29—229, 275